United States Patent

Askinazi et al.

[11] Patent Number: 5,818,631
[45] Date of Patent: Oct. 6, 1998

[54] ELECTRICALLY CONDUCTING, DIRECTLY BONDED INFRARED WINDOWS

[75] Inventors: Joel Askinazi, Trumbull, Conn.; Tom Feng, Hopewell Junction, N.Y.

[73] Assignee: Raytheon Company, Lexington, Mass.

[21] Appl. No.: 622,779

[22] Filed: Mar. 27, 1996

Related U.S. Application Data

[63] Continuation-in-part of Ser. No. 340,676, Nov. 16, 1994.
[51] Int. Cl.$^6$ ........................................... G02B 1/00
[52] U.S. Cl. .................................. 359/350; 64/41
[58] Field of Search ........................... 359/350; 427/154, 427/160; 65/41

[56] References Cited

U.S. PATENT DOCUMENTS

| | | |
|---|---|---|
| 4,311,743 | 1/1982 | Kasper et al. . |
| 4,778,731 | 10/1988 | Kraatz et al. . |
| 4,939,043 | 7/1990 | Biricik et al. . |
| 5,007,689 | 4/1991 | Kelly et al. . |
| 5,067,781 | 11/1991 | Montanari et al. . |
| 5,120,602 | 6/1992 | Tustison et al. . |

OTHER PUBLICATIONS

"Semiconductor wafer bonding: recent developments", *Materials Chemistry and Physics*, by Q.-Y Tong and U. Gösele*, 37 (1994) 101, 102, 113, 114.

U. S. Patent Application entitled "Composite Infrared Windows Fabricated By Direct Bonding", U. S. Serial No. 08/340,676, filed Nov. 16, 1994, Feng et al.

*Primary Examiner*—Jon W. Henry
*Assistant Examiner*—Darren E. Schuberg
*Attorney, Agent, or Firm*—W. C. Schubert; G. H. Lenzen, Jr.

[57] ABSTRACT

An electrically conductive infrared (IR) window (10) has high transmittance at IR wavelengths and includes an electrically conductive protective layer (14) which is direct bonded to a substrate (16) at room temperature without adhesive therebetween. The protective layer (14) and substrate (16) are transparent at IR wavelengths. The protective layer (14) and the substrate (16) are annealed at a bonding temperature above room temperature to enhance the bond strength. The protective layer (14) preferably comprises at least one of doped silicon and doped gallium arsenide and has a conductivity between 1 and 500 ohms/square. The substrate (16) preferably comprises at least one of zinc sulfide, zinc selenide, germanium, and gallium arsenide. The protective layer (14) and substrate (16) should be made of different materials with different coefficients of thermal expansion to allow debonding by heating above the bonding temperature.

30 Claims, 2 Drawing Sheets

ELECTRICALLY CONDUCTING, DIRECTLY BONDED INFRARED WINDOWS

CROSS REFERENCE TO A RELATED APPLICATION

This application is a continuation-in-part of U.S. application Ser. No. 08/340,676, filed Nov. 16, 1994.

BACKGROUND OF THE INVENTION

1. Technical Field

This invention relates to infrared windows and, more particularly, to fabrication of composite, electrically conductive infrared windows by direct bonding.

2. Discussion

For applications such as reconnaissance, target acquisition, and/or target tracking, military aircraft often require imaging and sensing devices which operate at infrared (IR) wavelengths (approximately 2.5–12 microns). The imaging and sensing devices are preferably located on the aircraft in an unobstructed position. Because such aircraft travel at high speeds through desert regions and rain, the imaging and sensing devices are subjected to high speed rain and sand impact.

To protect the costly and sensitive imaging and sensing devices, a protective window is positioned over the devices. The window must be "transparent" at IR wavelengths to allow the imaging and sensing devices to operate ("IR-transparent window"). In addition to the function of physical protection of the image and sensing devices, IR-transparent windows preferably address additional environmental conditions that are encountered.

Because both military and nonmilitary aircraft encounter electromagnetic interference (EMI), an outer protective layer of the IR-transparent window is preferably made from an electrically conductive material. When EMI is encountered, the IR-transparent window can shield against such EMI.

An IR-transparent window may also be subjected to varied temperature conditions. Ice and/or frost may build up on the IR-transparent window. Preferably IR-transparent windows should also have defogging and deicing capabilities. If the IR-transparent window is electrically conductive and sufficiently resistive, passing current through the conductive IR-transparent window will produce heat which will dissipate the ice or frost.

Still other IR-transparent windows are installed on stealthy aircraft which preferably have low radar observability and cross-sections. To that end, such IR-transparent windows require appropriate electrical conductivity. One or more of these design concerns may be present in a single IR window.

Conventional electrically conductive windows and methods of fabricating the windows are undesirable or not feasible for many reasons. For example, conventional visible-transparent or near-infrared (0.5–2 microns) optical windows meet the EMI shielding, defogging/deicing and/or low radar cross-section requirements. However, such visible-transparent and near-IR windows are not transparent at the longer IR wavelengths.

Visible-transparent windows use a visible-transmitting, electrically conducting outer coating, such as tin oxide or indium tin oxide, which is deposited on a substrate. Visible-transparent windows cannot operate at IR wavelengths, however, because these outer coating materials suffer from free-carrier absorption which occurs in the IR region of the spectrum. Free-carrier absorption increases as the wavelength increases. Therefore, the loss in transmittance is much greater at IR wavelengths as compared with visible wavelengths.

Conventional methods of producing electrically conductive windows for imaging and sensing applications at IR wavelengths have several significant drawbacks. In one approach, metal grids are formed on an outer surface of the IR window. The metal grids cause optical blockage and/or diffraction of image signals transmitted therethrough. Furthermore, the metal grids tend to delaminate when subjected to particle impact, such as high speed rain and sand encountered by aircraft.

In another approach, a heavily doped semiconductor film is deposited on top of the window, see, for example, Biricik et al., "Optically Transparent Electrically Conductive Semiconductor Windows", U.S. Pat. No. 4,939,043. The doped semiconductor films are typically polycrystalline with very small grain size and/or are amorphous. These film materials have low carrier mobility and poor electrical conductivity. Processes used to deposit these films employ high-temperature, hydrogen-based gases and/or plasma which are not compatible with many IR window substrate materials.

In still another approach, an upper stratum of an IR window is directly doped using techniques such as ion implantation or gas-phase diffusion. The doping renders the upper stratum of the IR window substrate electrically conducting, see, for example, Kraatz et al., "Optically Transparent Electrically Conductive Semiconductor Windows and Methods of Manufacture", U.S. Pat. No. 4,778,731. Most materials used as substrates for an IR window cannot be adequately doped to achieve sufficient electrical conductivity and/or require prohibitively long drive-in diffusion time.

Conventional conductive IR windows for airborne applications lack high-speed sand and rain impact durability and, as a result, experience cumulative surface and sub-surface damages which result in large optical transmittance loss and/or reduced conductivity. Repair or replacement of the IR window is expensive and/or time consuming. Protective coatings which are deposited on IR windows are expensive and time consuming to repair due to the difficulty of completely removing the protective coating and the need to re-polish and re-coat the IR substrate.

IR windows including a protective layer bonded to an IR substrate using an adhesive are also undesirable. The bonding adhesive layer must satisfy stringent optical, thermal, electrical and mechanical requirements. The adhesive bonding material is also difficult to remove during repair. Some of the adhesive bonding materials, such as chalcogenide glasses are also toxic and difficult to handle safely during fabrication.

Therefore, an IR window having high electrical conductivity, high IR transmission characteristics over a broad bandwidth, improved image quality, high mechanical durability, and low cost fabrication and maintenance is desirable.

SUMMARY OF THE INVENTION

An electrically conductive infrared (IR) window and a method of fabricating said IR window, according to the present invention, which has a high transmittance at IR wavelengths, includes a protective layer which is transparent at IR wavelengths and electrically conductive and a substrate which is transparent at IR wavelengths. The protective layer is direct bonded to the substrate at room temperature without adhesive therebetween.

According to other features of the invention, the protective layer and the substrate can be annealed at a bonding temperature above room temperature to increase bonding strength. The protective layer comprises at least one of silicon and gallium arsenide. The substrate comprises at least one of zinc sulfide, zinc selenide, germanium, and gallium arsenide. Antireflection coatings can be applied to an outer surface of the protective layer and/or an inner surface of the substrate after the annealing step. The protective layer has a thickness between 0.15–2.0 millimeters and conductivity in the range of 1 to 500 ohms/square.

According to another feature of the invention, the protective layer and the IR substrate have different coefficients of thermal expansion. After the protective layer has cumulative surface damage, the IR window can be heated above the bonding temperature to debond the protective layer and the substrate. Subsequently a new protective layer can be direct bonded to the IR substrate.

BRIEF DESCRIPTION OF THE DRAWINGS

These and various other advantages of the present invention will become apparent to those skilled in the art after studying the following disclosure and by reference to the drawings in which.

DETAILED DESCRIPTION OF THE PREFERRED EMBODIMENTS

Figure 1:
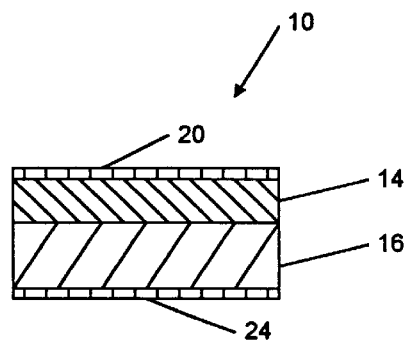
FIG. 1 illustrates a cross-sectional view of an electrically conductive IR window according to the present invention.

The present invention offers a simple and reliable conductive IR-transparent window and a method for fabricating an electrically conducting and IR-transparent window that meets present electrical and optical requirements and provides EMI shielding, low observability to radar, and/or defrosting and deicing capabilities. Referring to FIG. 1, an electrically conducting IR window 10 according to the present invention is illustrated and includes an electrically conductive protective layer 14 direct bonded to an IR substrate 16. In a preferred embodiment, an anti-reflection (AR) coating 20 can be applied to an outer surface of protective layer 14 and an AR coating 24 can be applied to an inner surface of IR substrate 16.

Figure 2:
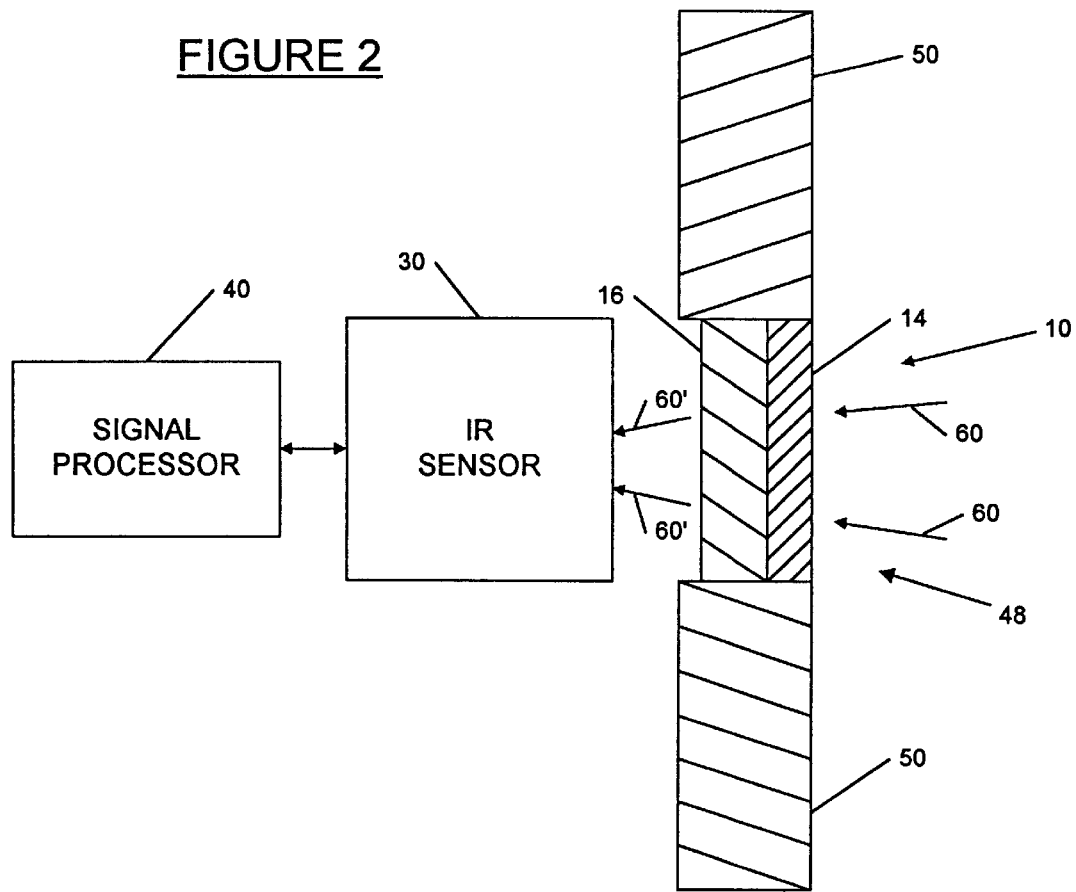
FIG. 2 illustrates a conductive IR window of FIG. 1 installed as a shield for IR sensing electronics in an aircraft.

Referring to FIG. 2, a typical environment for IR window 10 is illustrated. IR window 10 is illustrated as a shield for an IR sensor 30 connected to a signal processor 40. IR window 10 is mounted in an opening 48 of an outer structure 50 of an aircraft with protective layer 14 positioned in an outwardly facing manner. Infrared rays 60 travel through IR window 10 (as illustrated at 60') and impinge upon IR sensor 30.

For example, IR sensor 30 and signal processor 40 can be associated with reconnaissance, target acquisition and/or target detection and tracking ("processing") electronics. Skilled artisans can appreciate that IR window 10 has numerous other applications.

IR substrate 16 preferably comprises zinc selenide (ZnSe), zinc sulfide (ZnS) and/or germanium (Ge). Electrically conductive protective layer 14 is preferably doped until it is electrically conductive. Preferably the electrically conductive protective layer 14 comprises silicon (Si) and/or gallium arsenide (GaAs).

Preferably, the electrically conductive protective layer 14 has a thickness in the range of 0.15 to 2 millimeters (mm). In a highly preferred embodiment, the electrically conductive protective layer 14 has a thickness in the range of 0.25 to 1 mm. Electrically conductive protective layers having greater thicknesses become insufficiently transparent in the 8–12 micron IR wavelength range, while thinner layers lack sufficient mechanical strength.

The desired conductivity will determine the doping concentration and dopant material selection. Suitable dopants such as phosphorus and arsenic can be used. Still other dopants will be readily apparent. Preferably the electrically conductive protective layer 14 has a conductivity within the range of 1 to 500 ohms/square. In a more preferred embodiment, the conductivity lies in the range of 1 to 100 ohms/square.

Some applications may have conflicting conductivity requirements. For example, EMI applications prefer conductivity of approximately 10 ohms/square. In contrast, defrost and de-ice applications require heat generation and prefer conductivity in the range of 50 to 500 ohms/square.

Electrically conductive, protective layer 14 is preferably direct bonded at room temperature to IR substrate 16. Direct bonding involves contacting two mating surfaces at room temperature. In theory, direct room-temperature bonding is possible between any pair of materials as long as the following conditions are met: (1) the mating surfaces are sufficiently flat and smooth; (2) the surfaces are clean and free of particulates; and (3) the van der Waals attractive forces between the atoms on the two surfaces are sufficiently strong. In general, hydrogen bonding results in a much stronger van der Waals force. Therefore, hydrophilic surfaces are preferred over that of hydrophobic.

Stronger hydrogen bonding will also ease the flatness and smoothness requirements of the mating surfaces. To increase the bonding strength, the room-temperature bonded pair can be annealed at higher temperatures. Skilled artisans can appreciate that a sufficiently strong bond may be achieved without annealing. However, for use in harsh environments, annealing is preferred. In bonding dissimilar materials, such as Si and ZnS, the maximum annealing temperature is limited by the difference in the coefficients of thermal expansion (CTE) of the two materials. The dissimilar CTE can be advantageously utilized as was described in "Composite Infrared Windows Fabricated By Direct Bonding" and U.S. application Ser. No. 08/340,676, filed Nov. 16, 1994. To take advantage of the debonding properties, protective layer 14 and IR substrate 16 should not be made of the same material so that they have different CTE to allow debonding by heating above the bonding or annealing temperature.

When the electrically conductive protective layer 14 and the IR substrate have different CTE, heating can be employed to debond or separate the electrically conductive protective layer 14 from the IR substrate 16. Such debonding can be employed to replace the electrically conductive protective layer 14 after cumulative surface damage has occurred, for example due to particle impact from high speed sand and/or rain. As a result, the IR substrate can be reused and the cost of repair and/or maintenance can be significantly reduced.

It is well known that particles a few micrometers in diameter entrapped between the two bonding surfaces can result in bubbles (i.e. an unbonded area) several millimeters in diameter. Therefore, for bubble-free bonding, such particles are preferably removed prior to contacting the two surfaces. Particles are preferably removed by performing the bonding in a microelectronics cleanroom. An alternative approach is to perform the bonding using a "microcleanroom" apparatus which is discussed in detail in "Semiconductor Wafer Bonding: Recent Developments", Q. Y. Tong and U. Gosele, Materials Chemistry and Physics, Vol. 37, pp.101–127 (1994), hereby incorporated by reference. Use of the low-cost microcleanroom provides bubble-free bonding in a regular laboratory environment.

In a highly preferred embodiment, the electrically conductive protective layer 14 is made of single-crystal, prime-grade Si wafers grown by either the Czochralski (CZ) or the float-zone (FZ) method. Because the FZ Si has much lower oxygen concentration than that in CZ Si, it is used in applications where the small oxygen absorption band at 9 $\mu$m cannot be tolerated. Preferably the Si layer thickness is chosen to be in the range of 0.25 to 1.0 mm. At such thickness, the Si layer is transparent up to 16 $\mu$m and also serves as a robust protective layer against high-speed rain and sand erosion.

After direct bonding at room temperature, the Si/ZnS bonded pair is preferably annealed at a higher temperature to increase the bonding strength. The bondability and the quality of the bond depend on the flatness and smoothness of the ZnS surface. High quality, bubble-free bonds can be initiated spontaneously at room temperature using very flat ZnS wafers having a RMS microroughness of about 5 Å. With the application of external pressure, direct bonding of Si to ZnS wafers having much rougher surfaces can be achieved at room temperature.

To improve the overall IR transmittance of the window, the outer surface of the Si layer and the inner surface of the ZnS optical substrate are coated with antireflection (AR) coatings either before or after the direct bonding. Preferably a multi-layer hard carbon AR coating is employed for the outer surface of the Si layer.

By providing an electrically conductive protective layer 14, many different types of environmental conditions can be addressed. IR window 10 can be utilized in situations requiring high IR-transmittance and high durability when exposed to particle impact from the high speed sand and rain. During use, the aircraft may also encounter hostile or undesirable electromagnetic interference (EMI) which can block or confuse IR processing electronics. Alternately, aircraft may be traveling in an area of high commercial activity and be subjected to environmental EMI. An aircraft traveling in colder temperatures may experience ice and/or fog which accumulates on electrically conductive protective layer 14. By applying current across conductive layer 14 using electrodes (not shown), heat is generated and the ice or fog is eliminated.

An electrically conductive protective layer 14 has other beneficial uses. Furthermore, a stealthy aircraft may be traveling in an environment which is being monitored by a radar system. Radar systems generally transmit signals in a region of interest. The radar system measures reflected signals to detect objects in the region. If the conductivity of the IR window is not appropriate, the aircraft may have a relatively high radar cross-section. According to the invention, the conductivity of the IR window is adjusted consistent with the requirements for low radar observability.

EXAMPLE #1

In a highly preferred embodiment, a 50 mm diameter Si/ZnS electrically conducting composite IR window is fabricated as follows: Employing a micro-cleanroom apparatus, a 50 mm diameter, 0.5 mm thick CZ Si wafer is directly bonded to a 50 mm diameter, 1 mm thick ZnS optical IR substrate. The Si electrically conductive protective layer 14 is preferably a standard, prime-grade, CZ single-crystal wafer which was chemo-mechanical polished (CMP) to a RMS microroughness of a few Å.

During the crystal growth, the Si is doped with phosphorus to a resistivity of approximately 0.2 ohm centimeter (cm). The polycrystalline ZnS optical IR substrate 16 with $\mu$m-sized crystallites was made using chemical vapor deposition (CVD). The IR substrate 16 is mechanically polished with diamond powders to a RMS microroughness of about 5 Å. Prior to bonding, the Si wafer (or electrically conductive protective layer 14) was cleaned by the standard RCA solutions, whereas the ZnS IR substrate 16 was cleaned by successive rinsing in a series of organic solvents.

The two precleaned wafers (layer 14 and substrate 16) are placed face-to-face with a gap of approximately 1.5 mm between them. Highly filtered and deionized water at a pressure of approximately 20 psi is flushed through the gap between layer 14 and substrate 16 to remove any remaining particulates. After placing a transparent cover over the layer 14 and substrate 16, they are spin-dried at 3000 rpm for 5 min while being heated with a 250 W infrared lamp. During this spin-drying step, the temperature of the mating materials approaches 80°–90° C. Immediately after drying, the layer 14 and substrate 16 are brought into contact by simultaneously removing the spacers that separate layer 14 and substrate 16. The room-temperature bonding was then initiated by exerting a slight pressure at a center point of the mated surfaces. Once initiated, a contacting wave, with a speed of several cm/s, is spread radially outward over the entire wafer pair to push out any trapped air. The progression of the contacting wave and the quality of the bond are then viewed with an infrared imaging system.

The bonding strength can be inferred by measuring the interface energy of the bonded pair using the crack-opening method [W.P. Maszara et al., Journal of Applied Physics, 64, 4943 (1988)]. A razor blade of known thickness is inserted between the two mated surfaces at the edge of the bonded pair to generate an opening of length L. The opening length L was measured with an infrared imaging system. Knowing the Young's moduli and the thicknesses of the Si an ZnS wafers, the interface energy, which is proportional to the bonding energy, can be calculated. The interface energy of the Si/ZnS IR window 10, immediately after direct bonding at room temperature, is approximately 370 erg cm$^{-2}$. After annealing for 100 hours at 70° C., the interface energy increases to approximately 890 erg cm$^{-2}$.

The electrical conductivity of this composite Si/ZnS IR window 10 is measured with a standard four-point probe instrument designed for measuring the resistivity of Si wafers. With the probe tips in contact with the top Si layer 14, a sheet resistance of approximately 4 ohms per square is measured.

Figure 3:
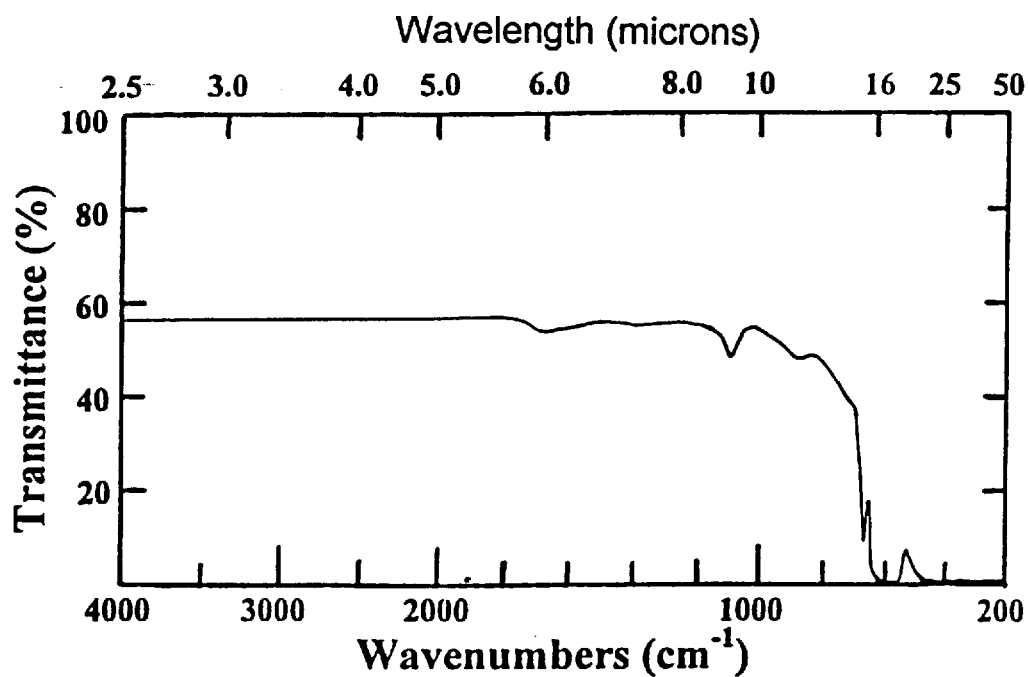
FIG. 3 is a graphical illustration of transmittance as a function of wavelength and wavenumbers for a first preferred embodiment of the present invention.

Referring to FIG. 3, the infrared transmittance in the wavelength range from 2.5 to 50 $\mu$m is illustrated for this IR window. The IR transmittance of the IR window resembles mainly the transmittance of ZnS because of the thinness of the Si layer (0.5 mm). At this thickness (0.5 mm), the normal lattice absorption bands of Si at wavelengths above about 6 $\mu$m are very weak. The small absorption band at 9 $\mu$m is due to interstitial oxygen present in CZ Si. Substantial increase in the optical transmission of this window can be realized with the application of antireflection coatings on both sides of the window.

EXAMPLE #2

In a second highly preferred embodiment, a 50 mm diameter, 0.5 mm thick FZ Si wafer is directly bonded to a 50 mm diameter, 1 mm thick ZnS optical substrate. During the crystal growth, the Si was doped with phosphorus to a resistivity of 0.3 ohm cm. All the bonding and processing conditions are similar to EXAMPLE #1 for the bonding of a CZ Si wafer to a ZnS wafer. The sheet resistance of the Si/ZnS window is approximately 6 ohms per square.

Figure 4:
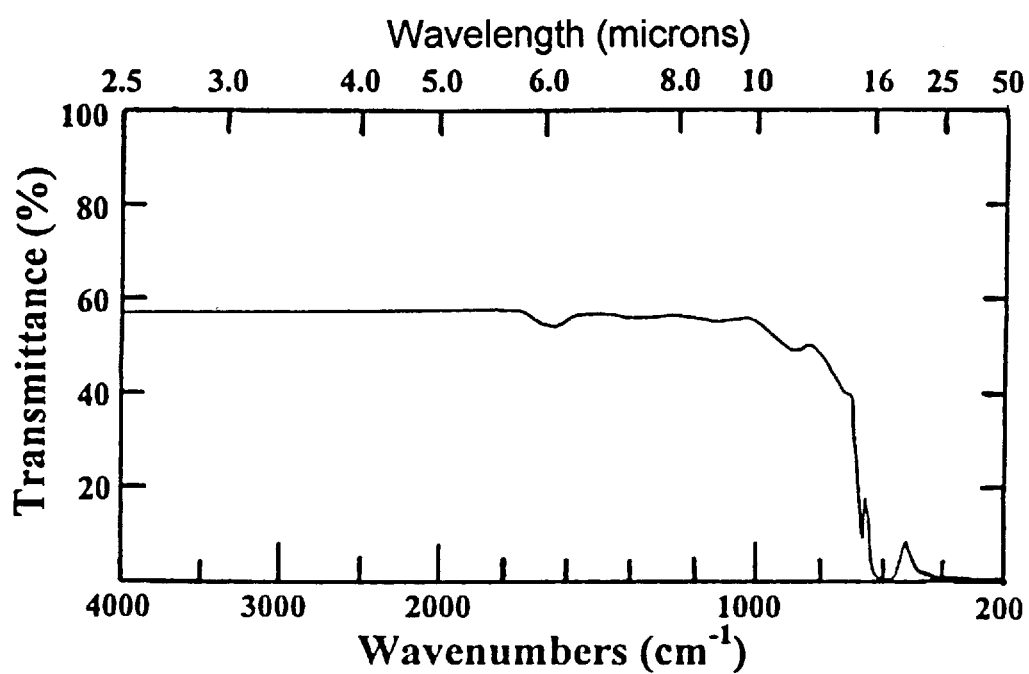
FIG. 4 is a graphical illustration of transmittance as a function of wavelength and wavenumber for a second preferred embodiment of the present invention.

FIG. 4 illustrates the IR transmittance in the wavelength range from 2.5 to 50 μm. Except for the absence of the oxygen absorption band at 9 μm, due to much lower oxygen concentration in float-zone (FZ) Si, the IR transmission spectrum is similar to that shown in FIG. 3.

These examples clearly demonstrate the feasibility of IR windows having a sheet resistance of less than 10 ohm per square by directly bonding an appropriately doped semiconductor layer (Si) to an IR substrate (ZnS).

As can be appreciated from the foregoing, IR window 10 according to the present invention includes an electrically conductive protective layer direct bonded to an IR substrate. Because IR window 10 is electrically conductive, critical functions such as EMI shielding, defogging and deicing capabilities, and/or a low radar cross-section for low radar observability can be obtained.

An electrically conductive IR window having a sheet resistance of 10 ohm per square or less can also be obtained.

Because direct bonding is employed, repair of cumulative surface damage caused by particle impact, such as high speed rain and sand, can be readily performed without the attendant disadvantages of bonding adhesives and/or deposition. The method for repairing IR window 10 according to the present invention is less time consuming and costly than conventional methods of repairing an electrically conductive IR window. Still other advantages will be readily apparent.

The various advantages of the present invention will become apparent to those skilled in the art after a study of the foregoing specification and the following claims.

What is claimed:

1. A method of fabricating an electrically conductive infrared (IR) window which has a high transmittance at IR wavelengths comprising the steps of:
   providing an electrically conductive protective layer which is transparent at IR wavelengths;
   providing a substrate which is transparent at IR wavelengths;
   removably directly bonding said protective layer to said substrate at room temperature without adhesive therebetween; and
   heating said protective layer and said substrate to an annealing temperature and for a time sufficient enough to strengthen said bond between said protective layer and said substrate yet allowing said protective layer to be removed from said substrate without damaging said substrate.

2. The method of claim 1 further comprising the step of:
   removing particles from at least one of said inner surface of said protective layer and said outer surface of said substrate prior to said step of direct bonding.

3. The method of claim 1 further comprising the step of:
   applying an antireflection coating to an outer surface of said protective layer.

4. The method of claim 1 further comprising the step of:
   applying an antireflection coating to an inner surface of said substrate after said annealing step.

5. The method of claim 1 further comprising the step of:
   installing said IR window as a shield for an IR sensor.

6. The method of claim 5 further comprising the step of:
   replacing said protective layer when cumulative surface damage has occurred.

7. The method of claim 1 further comprising the steps of:
   monitoring said protective layer for cumulative surface damage; and
   debonding said protective layer from said substrate by heating said IR window above said annealing temperature.

8. The method of claim 7 further comprising the steps of:
   providing a new electrically conductive protective layer which is transparent at IR wavelengths;
   removably directly bonding an inner surface of said new protective layer and an outer surface of said substrate at room temperature without adhesive therebetween; and
   heating said new protective layer and said substrate to an annealing temperature such that said protective layer remains removably directly bonded to said substrate and may be removed therefrom without damaging said outer surface of said substrate.

9. The method of claim 1 wherein said protective layer and said substrate have different coefficients of thermal expansion.

10. The method of claim 1 wherein said protective layer comprises at least one of silicon and gallium arsenide.

11. The method of claim 1 wherein said substrate comprises at least one of zinc sulfide, zinc selenide, germanium, and gallium arsenide.

12. The method of claim 1 wherein said protective layer has a thickness between 0.15–2.0 millimeters.

13. The method of claim 1 wherein said protective layer has a thickness between 0.25 to 1.0 millimeters.

14. The method of claim 1 wherein said protective layer has a conductivity in the range of 1 to 500 ohms/square.

15. The method of claim 1 wherein said protective layer has a conductivity in the range of 1 to 100 ohms/square.

16. The method of claim 1 wherein said annealing temperature and time further comprises a temperature of about 50°–80° C. and a time of about 50–150 hours.

17. An infrared (IR) window which has a high transmittance at IR wavelengths comprising:
   an electrically conductive, IR-transparent protective layer of a first material removably directly bonded at room temperature to an IR-transparent substrate of a second material, distinct from said first material, without adhesive therebetween, said window being heated to an annealing temperature sufficient to strengthen said bond yet allowing said protective layer to be removed from said substrate without damaging said substrate.

18. The IR window of claim 17 wherein mating surfaces of the protective layer and said substrate are free of foreign particles.

19. The IR window of claim 17 further comprising: an antireflection coating applied to at least one of an outer surface of said electrically conductive, IR-transparent protective layer and an inner surface of said IR-transparent substrate.

20. The IR window of claim 17 wherein said electrically conductive, IR-transparent protective layer and said IR-transparent substrate have different coefficients of thermal expansion to allow debonding by heating said IR window above said annealing temperature.

21. The IR window of claim 17 wherein said electrically conductive, IR-transparent protective layer comprises at least one of silicon and gallium arsenide.

22. The IR window of claim 17 wherein said IR-transparent substrate comprises at least one of zinc sulfide, zinc selenide, germanium, and gallium arsenide.

23. The IR window of claim 17 wherein said electrically conductive, IR-transparent protective layer has a thickness of approximately 0.15–2.0 millimeters.

24. The IR window of claim 17 wherein said electrically conductive, IR-transparent protective layer has a thickness of approximately 0.25–1.0 mm.

25. The IR window of claim 17 wherein said electrically conductive, IR-transparent protective layer has a conductivity in the range of 1 to 500 ohms/square.

26. The IR window of claim 17 wherein said electrically conductive, IR-transparent protective layer has a conductivity in the range of 1 to 100 ohms/square.

27. An infrared (IR) window having a high transmittance at IR wavelengths comprising:

a ZnS or ZnSe substrate; and a phosphorous doped Si protective layer directly bonded and annealed to said substrate without an adhesive therebetween such that said protective layer may be removed from said substrate without damaging said substrate.

28. The infrared window of claim 27 further comprising an antireflection coating deposited on at least one of an outer surface of said protective layer and an inner surface of said substrate.

29. The infrared window of claim 27 wherein said protective layer has a thickness between 0.15–2.0 millimeters.

30. The infrared window of claim 27 wherein said protective layer has a conductivity in a range of 1 to 500 ohms/square.

* * * * *